US010242768B2

(12) United States Patent
Inao et al.

(10) Patent No.: US 10,242,768 B2
(45) Date of Patent: Mar. 26, 2019

(54) WIRE HARNESS EXTERIOR MEMBER AND WIRE HARNESS

(71) Applicant: YAZAKI CORPORATION, Tokyo (JP)

(72) Inventors: Shinichi Inao, Makinohara (JP); Hideomi Adachi, Makinohara (JP); Takeshi Ogue, Makinohara (JP); Tatsuya Oga, Makinohara (JP); Masaaki Suguro, Makinohara (JP); Yoshiaki Ozaki, Makinohara (JP); Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 155 days.

(21) Appl. No.: 14/588,721

(22) Filed: Jan. 2, 2015

(65) Prior Publication Data

US 2015/0114680 A1    Apr. 30, 2015

Related U.S. Application Data (63) Continuation of application No. PCT/JP2013/070657, filed on Jul. 30, 2013.

(30) Foreign Application Priority Data

Aug. 1, 2012 (JP) .................................. 2012-170833

(51) Int. Cl.
*B60R 16/02* (2006.01)
*H01B 7/18* (2006.01)
*H02G 3/32* (2006.01)

(52) U.S. Cl.
CPC ............ *H01B 7/18* (2013.01); *B60R 16/0215* (2013.01); *H02G 3/32* (2013.01)

(58) Field of Classification Search
CPC . B60R 16/02; B60R 16/0215; B60R 16/0207; H01B 7/18; H01B 7/17;
(Continued)

(56) References Cited

U.S. PATENT DOCUMENTS 3,464,721 A * 9/1969 Surko, Jr. ............. F16L 21/005
                                                      285/148.17
6,398,170 B1    6/2002 Wada
(Continued)

FOREIGN PATENT DOCUMENTS

CN    101471550 A    7/2009
EP    1 022 503 A1   7/2000
(Continued)

OTHER PUBLICATIONS

Communication dated Mar. 24, 2016 issued by European Patent Office in counterpart European Patent Application No. 13825392.7.
(Continued)

*Primary Examiner* — Timothy J Thompson
*Assistant Examiner* — Guillermo J Egoavil
(74) *Attorney, Agent, or Firm* — Sughrue Mion, PLLC (57) ABSTRACT

A wire harness exterior member includes a flexible tube portion, an inflexible tube portion, and a post-attached part attached to a boundary between the flexible tube portion and the inflexible tube portion. The post-attached part is attached such that at least a portion of an attaching surface of a rigid attaching portion overlaps the flexible tube portion.

1 Claim, 5 Drawing Sheets

(58) Field of Classification Search
CPC ........ H01B 7/0045; H01B 9/006; H02G 3/32; H02G 3/0691
USPC .................................. 174/72 A; 248/74.1
See application file for complete search history.

(56) References Cited

U.S. PATENT DOCUMENTS

| | | | | |
|---|---|---|---|---|
| 2003/0037942 A1* | 2/2003 | Haselby | ............... | H05K 9/0018 174/382 |
| 2006/0134970 A1* | 6/2006 | Watanabe | ............... | H02G 11/00 439/501 |
| 2006/0278423 A1* | 12/2006 | Ichikawa | ............ | B60R 16/0215 174/72 A |
| 2009/0166480 A1 | 7/2009 | Sakata et al. | | |
| 2010/0148015 A1* | 6/2010 | Matsuno | ............... | F16L 3/1075 248/65 |
| 2011/0067920 A1* | 3/2011 | Toyama | ............... | B60R 16/0207 174/72 A |
| 2011/0088944 A1 | 4/2011 | Ogue et al. | | |
| 2013/0140054 A1 | 6/2013 | Kato et al. | | |

FOREIGN PATENT DOCUMENTS

| | | | |
|---|---|---|---|
| EP | 2 075 887 A1 | 7/2009 | |
| JP | 2008-104304 A | 5/2008 | |
| JP | 2009-143326 A | 7/2009 | |
| JP | 2010-012868 A | 1/2010 | |
| JP | 2011-072079 A | 4/2011 | |
| JP | 2012-045962 A | 3/2012 | |
| JP | WO 2013042387 A1 * | 3/2013 | ......... B60R 16/0215 |
| JP | WO 2013122263 A1 * | 8/2013 | ......... B60R 16/0215 |
| WO | WO-2013122263 A1 * | 8/2013 | ......... B60R 16/0215 |

OTHER PUBLICATIONS

International Search Report for PCT/JP2013/070657 dated Sep. 24, 2013 [PCT/ISA/210].
Written Opinion for PCT/JP2013/070657 dated Sep. 24, 2013 [PCT/ISA/237].
Communication dated Jan. 4, 2017, issued by the State Intellectual Property Office of the People's Republic of China in counterpart Chinese Patent Application No. 201380041166.1.
Communication dated Jun. 3, 2016, issued by the State Intellectual Property Office of the People's Republic of China in counterpart Chinese Patent Application No. 201380041166.1.
Communication dated Feb. 14, 2017, issued by the European Patent Office in counterpart European application No. 13825392.7.

* cited by examiner

WIRE HARNESS EXTERIOR MEMBER AND WIRE HARNESS

CROSS REFERENCE TO RELATED APPLICATIONS

This application is a continuation of International Patent Application No. PCT/JP2013/070657 filed on Jul. 30, 2013, claiming priority from Japanese Patent Application No. 2012-170833 filed on Aug. 1, 2012, the contents of which are incorporated herein by reference.

FIELD OF INVENTION

The present invention relates to a wire harness exterior member and a wire harness including this exterior member.

BACKGROUND ART

High-voltage (i.e., for high voltage) wire harnesses are used as components for electrical connection between, for example, a battery and an inverter unit of a hybrid car or an electric car. Some wire harnesses for the electrical connection between the battery and the inverter unit include a plurality of high-voltage conducting paths and an exterior member for protecting these conducting paths (see Patent Document 1 identified below).

Patent Document 1: JP 2010-12868 A

A wire harness disclosed in Patent Document 1 uses a resin member as an exterior member. With respect to a resin exterior member, the inventors have been considering use of an exterior member having a flexible tube portion formed as a flexible portion and an inflexible tube portion formed as an inflexible portion and continuing from the flexible tube portion. In this exterior member, however, in the case where the flexible tube portion is molded to have a length larger than a desired length, the exterior member may be bent at a position different from a desired bending position. Besides, in the case where the flexible tube portion is molded to have a length larger than a desired length, if the exterior member has a prescribed length, the length of the inflexible tube portion becomes smaller correspondingly to the larger length of the flexible tube portion. Therefore, the inflexible tube portion cannot be used in a state where it is long, namely, with its desired length.

SUMMARY OF INVENTION

The present invention has been made in view of the above circumstances, and it is an object thereof to provide a wire harness exterior member and a wire harness in which the influence of dimensional variation can be reduced.

To solve the problem described above, a wire harness exterior member and a wire harness according to the present invention have the following features (1) to (4).

(1) A wire harness exterior member including a flexible tube portion formed as a flexible portion, an inflexible tube portion formed as an inflexible portion and continuing from the flexible tube portion, and a post-attached part attached to a boundary between the flexible tube portion and the inflexible tube portion, in which the post-attached part includes a rigid attaching portion, the post-attached part being attached such that at least a portion of an attaching surface of the rigid attaching portion overlaps the flexible tube portion.

(2) The wire harness exterior member according to (1) described above, in which the portion of the rigid attaching portion overlapping the flexible tube portion is configured as an inflexible tube extension portion for extending the inflexible tube portion.

(3) The wire harness exterior member according to (1) described above, in which the portion of the rigid attaching portion overlapping the flexible tube portion is configured as a tolerance absorbing portion for reducing influence of production tolerance of the flexible tube portion.

(4) A wire harness including the wire harness exterior member according to any one of (1) to (3) described above, and a conducting path covered by the wire harness exterior member.

In the wire harness exterior member of (1) described above, the post-attached part is attached to the boundary between the flexible tube portion and the inflexible tube portion, and therefore, a part of the flexible tube portion overlapping the attaching surface of the rigid attaching portion works as a portion difficult to bend. Accordingly, in the wire harness exterior member of (1) described above, since a part of the flexible tube portion works as a portion difficult to bend similarly to the inflexible tube portion, influence of dimensional variation of the flexible tube portion can be reduced.

Besides, according to the wire harness exterior member of (1) described above, if there is a demand, for example, that the length of the flexible tube portion is to be slightly reduced, this demand can be met by attaching the post-attached part to overlap the flexible tube portion over a larger portion and there is no need to mold a new type of exterior member with a new part number. Thus, cost increase can be suppressed, and complicated component control can be prevented.

According to the wire harness exterior member of (2) described above, even if the flexible tube portion is molded to have a length larger than a desired length, the inflexible tube portion can be extended by using the inflexible tube extension portion of the post-attached part (i.e., the flexible portion can be shortened). Therefore, the inflexible tube portion can be used in a state where it is longer than when molded, namely, with a desired length.

According to the wire harness exterior member of (3) described above, even if the length of the flexible tube portion is varied, the influence of tolerance of the flexible tube portion can be reduced by the tolerance absorbing portion of the post-attached part.

According to the wire harness of (4) described above, since the wire harness exterior member of any one of (1) to (3) described above is included, even if the dimension is varied, the influence of the variation can be reduced. Accordingly, the present invention can provide a good wire harness.

EMBODIMENTS OF INVENTION

A wire harness according to the present embodiment includes a wire harness exterior member. This wire harness exterior member includes a flexible tube portion and an inflexible tube portion. In this wire harness exterior member, a post-attached part is attached to a boundary between the flexible tube portion and the inflexible tube portion, and the influence of dimensional variation of the flexible tube portion can be reduced by attaching this post-attached part.

Figure 1:
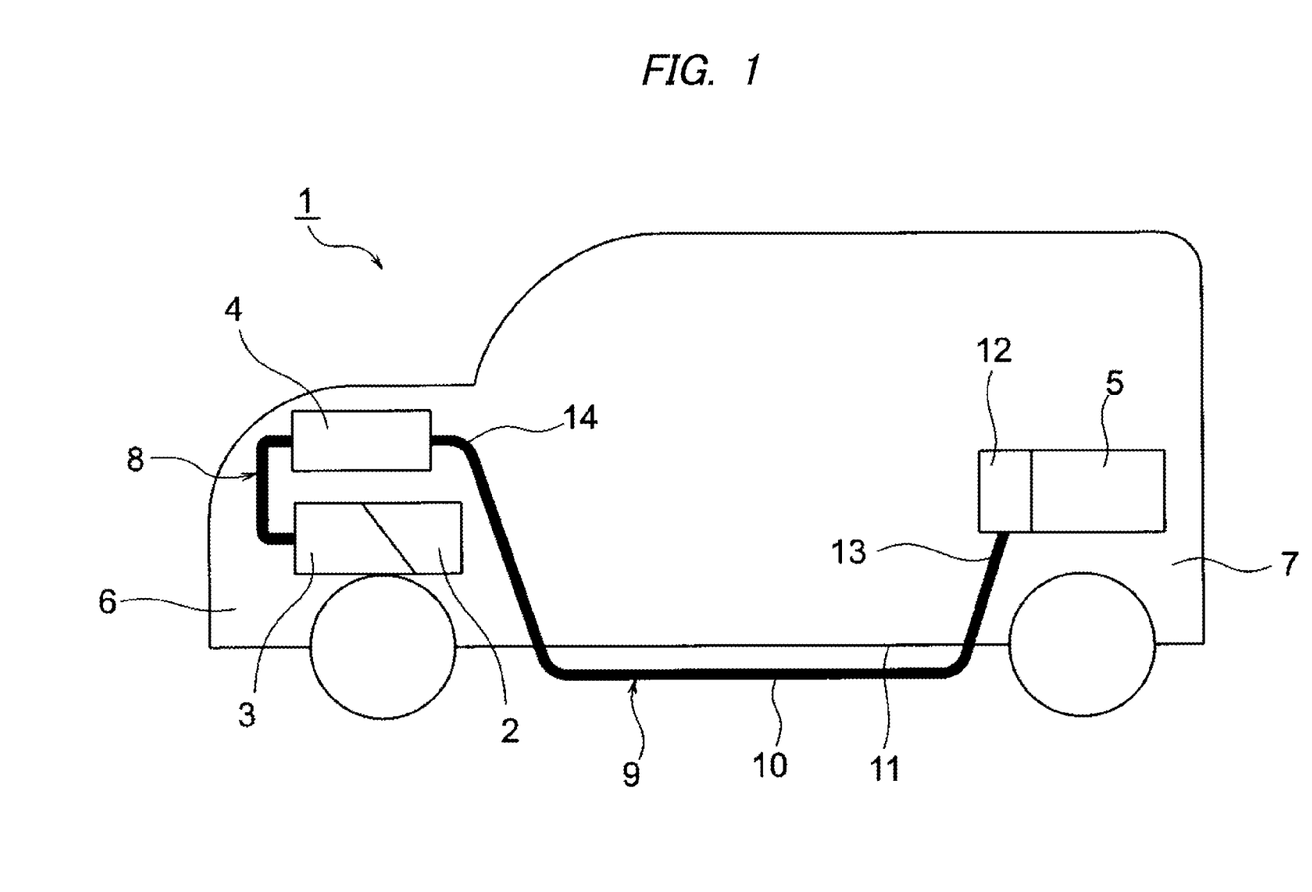
FIG. 1 is a schematic view illustrating an arrangement of a wire harness.
Figure 2:
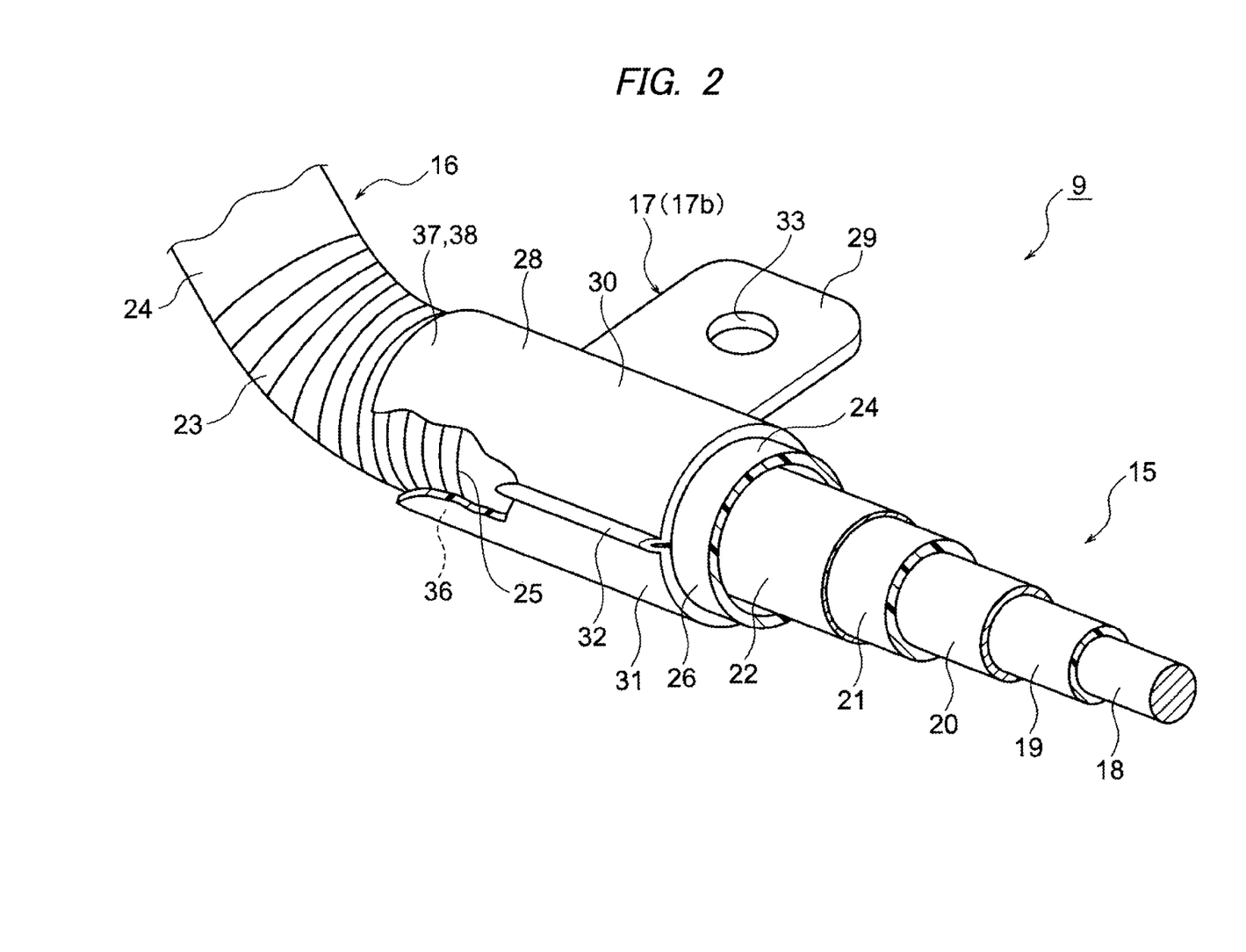
FIG. 2 is a diagram illustrating a configuration of the wire harness.
Figure 3:
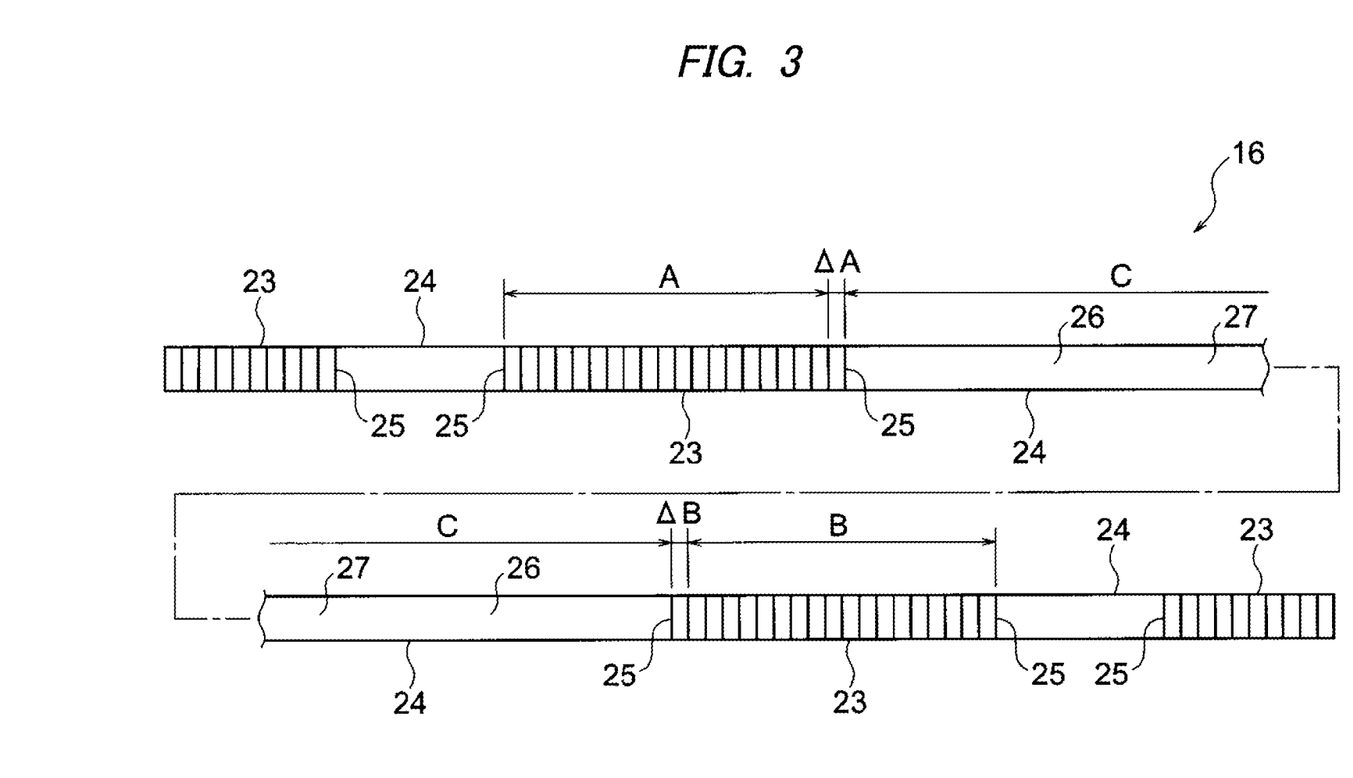
FIG. 3 is a diagram of an exterior member.

The embodiment of the wire harness and the wire harness exterior member (an exterior member 16) of the present invention will now be described with reference to FIGS. 1 to 5. FIG. 1 is a schematic view illustrating an arrangement of the wire harness. FIG. 2 is a diagram illustrating a configuration of the wire harness, FIG. 3 is a diagram of the exterior member, FIGS. 4A to 4D are diagrams illustrating attaching positions of a rigid attaching portion, and FIG. 5 is a diagram illustrating a fixed state of the wire harness.

In the present embodiment, description will be given on the assumption that the wire harness of the present embodiment is arranged in a hybrid car (which may be an electric car or a general vehicle).

In FIG. 1, a reference numeral 1 denotes a hybrid car. The hybrid car 1 is a vehicle driven by mixedly using two powers of an engine 2 and a motor unit 3. To the motor unit 3, an electric power from a battery 5 (in other words, a battery pack) is supplied via an inverter unit 4. In the present embodiment, the engine 2, the motor unit 3 and the inverter unit 4 are mounted in an engine room 6 positioned in the vicinity of the front wheels and the like. The battery 5 is mounted in a vehicle rear portion 7 in the vicinity of the rear wheels. The battery 5 may be mounted in a vehicle cabin provided behind the engine room 6.

The motor unit 3 and the inverter unit 4 are electrically connected to each other via a high-voltage wire harness 8. The battery 5 and the inverter unit 4 are also electrically connected to each other via a high-voltage wire harness 9. The wire harness 9 includes a intermediate portion 10 arranged in a vehicle underfloor portion 11. The wire harness 9 is arranged substantially parallel along the vehicle underfloor portion 11. The vehicle underfloor portion 11 is a known body and is what is called a panel member, and has a through hole (not shown) formed in a prescribed position. The wire harness 9 is inserted through this through hole.

The wire harness 9 is electrically connected to the battery 5 via a junction block 12 provided on the battery 5. A rear end portion 13 of the wire harness 9 is electrically connected to the junction block 12 by a known method. A front end portion 14 of the wire harness 9 is electrically connected to the inverter unit 4 by a known method.

The motor unit 3 includes a motor (not shown) and a generator (not shown). The inverter unit 4 includes an inverter (not shown) and a converter (not shown). The motor unit 3 is formed as a motor assembly including a shield case (not shown). The inverter unit 4 is also formed as an inverter assembly including a shield case (not shown). The battery 5 is a Ni-MH or Li-ion battery, and is formed as a module. It is noted that a power storage device such as a capacitor can be used. The battery 5 is not especially limited as long as it can be used in the hybrid car 1 or an electric vehicle.

First, the configuration and the structure of the wire harness 9 will be described. The wire harness 9 is a member for high voltage to electrically connect the inverter unit 4 and the battery 5 to each other as described above, and includes a high-voltage coaxial composite conducting path 15 (namely, a conducting path), an exterior member 16 (namely, a wire harness exterior member), and a clamp 17 (that is, a post-attached part used as a generic term for portions with reference numerals 17a and 17b). The wire harness 9 is fixed on the vehicle underfloor portion 11 or the like via the clamp 17 attached to the exterior member 16. It is noted that the term "high-voltage" means for use with high voltage.

In FIG. 2, the high-voltage coaxial composite conducting path 15 includes a plus circuit and a minus circuit by itself. In other words, the high-voltage coaxial composite conducting path 15 includes circuits of two systems. Specifically, the high-voltage coaxial composite conducting path 15 includes a first conducting path 18 positioned in the center of the high-voltage coaxial composite conducting path 15 and having a circular cross-section, and a first insulator 19 covering the outer circumference of the first conducting path 18 and having a prescribed thickness. The high-voltage coaxial composite conducting path 15 includes a second conducting path 20 provided outside the first insulator 19, and a second insulator 21 covering the outer circumference of the second conducting path 20 and having a prescribed thickness. The high-voltage coaxial composite conducting path 15 further includes a cylindrical electromagnetic shielding member 22 tightly adhering to the outer surface of the second insulator 21. It is noted that the high-voltage coaxial composite conducting path 15 may further include a sheath covering the outer circumference of the electromagnetic shielding member 22 and having a prescribed thickness.

The electromagnetic shielding member 22 is made of known braid, metal foil or the like, and apart from the arrangement in the above-described configuration of the high-voltage coaxial composite conducting path 15, it may be provided as follows: It may be provided on the second insulator 21 rather loosely.

The electromagnetic shielding member 22 may be formed into a cylindrical shape to be tightly adhered to the outer surface of the second insulator 21, or may be formed into a tape or sheet shape to be tightly wound around the second insulator 21.

The conducting path may be, other than the high-voltage coaxial composite conducting path 15 described above, a known high-voltage electric wire including a conductor and an insulator, a shielded wire, a cabtire cable, a bus bar provided with an insulator. The number of the conducting paths may be one or more.

The high-voltage coaxial composite conducting path 15 includes two systems in the present embodiment, but the number of systems is not limited to two but it may include three or more systems up to n systems. Specifically, when the number of circuits is increased outward so as to attain a coaxial and single wire configuration, n systems can be attained.

In FIGS. 2 and 3, the exterior member 16 (the wire harness exterior member) is a tube for housing and protecting the high-voltage coaxial composite conducting path 15, and includes a flexible tube portion 23 and an inflexible tube portion 24. The exterior member 16 is resin molded into a substantially linear shape as a whole. It is noted that the exterior member 16 may be made of a metal as long as it includes a flexible tube portion and an inflexible tube portion.

The flexible tube portion 23 is a flexible portion to be bent during the shipping or the routing of the wire harness 9, and the inflexible tube portion 24 continues from the flexible tube portion 23. The inflexible tube portion 24 is provided as an inflexible portion (in other words, a portion that is difficult to bend). The flexible tube portion 23 and the inflexible tube portion 24 are respectively provided and formed in positions and lengths in accordance with the shapes of attaching portions of a vehicle.

Even when the flexible tube portion 23 is molded to be slightly longer than a desired length, the excessive length can be adjusted by using a post-attached part (the excessive length can be adjusted by a clamp 17b described later). The post-attached part (the clamp 17b) is attached to a boundary 25 between the flexible tube portion 23 and the inflexible tube portion 24.

The number of each of the flexible tube portion 23 and the inflexible tube portion 24 is plural in the present embodiment, but their numbers are not especially limited. In other words, one flexible tube portion 23 may be provided to have two inflexible tube portions 24 respectively formed continuously to the both ends thereof. Alternatively, one inflexible tube portion 24 may be provided to have two flexible tube portions 23 respectively formed continuously to the both ends thereof.

The flexible tube portion 23 is formed to have a shape of a corrugated tube having, continuously along the lengthwise direction thereof, a plurality of depressions and protrusions formed around the circumferential direction of the outer surface thereof. The length of the flexible tube portion 23 is set in accordance with a bending range. The flexible tube portion 23 is formed as a portion that has flexibility (in other words, plasticity) to be bendable. The flexible tube portion 23 is formed as a portion similar to a known corrugated tube in the present embodiment. The shape of the flexible tube portion 23 is not limited to the shape of a corrugated tube in so far as it is flexible.

The flexible tube portion 23 is formed to have a cross-sectional shape according with the cross-sectional shape of an inflexible tube body 26 described later. It is noted that the cross-sectional shape is described merely as an example, and may be a different shape.

The exterior member 16 has a portion in a shape similar to a corrugated tube as described above, and hence can be regarded as a "corrugated tube" or a "partially corrugated tube".

The exterior member 16 is formed in a shape provided with no slit (namely, no cut) along its axial direction. A reason why no slit is provided is for improving the rigidity and strength. Another reason is for preventing a water content from entering the exterior member 16 to improve the water resistance. Still another reason is for preventing the high-voltage coaxial composite conducting path 15 from sticking out through, for example, a bent portion.

The inflexible tube portion 24 includes the inflexible tube body 26. The inflexible tube body 26 is formed as a portion that is not bent during the shipping or the routing described above. The portion that is not bent means a portion not positively provided with flexibility. The inflexible tube body 26 is formed in a straight tube shape having a circular cross-section. The shape of the inflexible tube body 26 is not limited to the shape with a circular cross-section, but it may have a cross-section in the shape of an ellipse, an oblong, a rectangle or the like. Since the inflexible tube body 26 is in the straight tube shape, the inflexible tube portion 24 may be regarded as a "straight tube portion" or a "straight portion".

The inflexible tube body 26 is formed to have a small thickness to attain the minimum necessary strength. The inflexible tube body 26 may be provided with, if necessary, a portion for improving a heat dissipation property and rigidity, a portion for securing the resistance to chipping, or the like.

The exterior member 16 includes, as the inflexible tube portion 24, an underfloor inflexible tube portion 27 arranged in the vehicle underfloor portion 11 (see FIGS. 1 and 5). Since the underfloor inflexible tube portion 27 is arranged in the vehicle underfloor portion 11 (for example, arranged along a lean hose), it is formed in a long shape.

In FIG. 2, as the clamp 17 attached, as the post-attached part, to the prescribed position in the exterior member 16, a known clamp is used. The clamp 17 includes a clamp 17a used for fixing the wire harness 9 on a vehicle, and a tolerance absorbing clamp 17b used for adjusting an excessive length if the flexible tube portion 23 is molded into a length slightly larger than a desired length. Incidentally, the clamp 17b may be also used for fixing the wire harness 9 on the vehicle in the same manner as the clamp 17a (or may be a dummy clamp not used for fixing) in the present embodiment.

The clamps 17a and 17b have the same shape in the present embodiment. Incidentally, it is not always necessary that they have the same shape, but the clamp 17b may be in a shape according with the boundary 25 because the clamp 17b is attached to the boundary 25. If they have the same shape, however, component control can be easily performed, and cost increase can be suppressed. Alternatively, the clamp 17b may be newly provided as a dedicated part separately from the clamp 17a.

The clamp 17 (17a or 17b) includes a rigid attaching portion 28 formed in accordance with the outer shape of the inflexible tube body 26, and a fixing portion 29 in a cantilever shape continued from the rigid attaching portion 28.

The rigid attaching portion 28 includes tube attachments 30 and 31 in a half-split shape, and a hinge 32 connecting these tube attachments 30 and 31 to each other. The rigid attaching portion 28 has rigidity and is formed as a portion difficult to bend. In other words, the rigid attaching portion 28 has larger bending rigidity than the flexible tube portion 23 and is difficult to bend. The tube attachments 30 and 31 have fitting portions not shown for fitting them to each other.

The fixing portion 29 has a bolt insertion hole 33 formed therethrough. The wire harness 9 is fixed on a fixing counterpart 35 (see FIG. 5) such as the vehicle underfloor portion 11 with a bolt 34 (see FIG. 5) inserted through the bolt insertion hole 33 (although the shape of the fixing counterpart 35 is merely exemplarily shown). When the wire harness 9 is fixed on the fixing counterpart 35, it is completely arranged as illustrated in FIG. 5.

In FIG. 3, if the flexible tube portion 23 is molded to have a length larger than a normal length A by a length ΔA, or if it is molded to have a length larger than a normal length B by a length ΔB, since it may be bent at a position different from a desired bending position, the clamp 17b (see FIGS. 4A to 4D) is attached to the boundary 25 for reducing the influence of a difference of the length ΔA or ΔB. Besides, assuming that the exterior member 16 has a given full length, if there arises a difference of the length ΔA or ΔB, there is a possibility that the length of the inflexible tube portion 24 has a length C smaller than its normal length, and therefore, the clamp 17b (see FIGS. 4A to 4D) is attached to the boundary 25 for reducing the influence of this length difference.

Figures 4A, 4B, 4C, 4D:
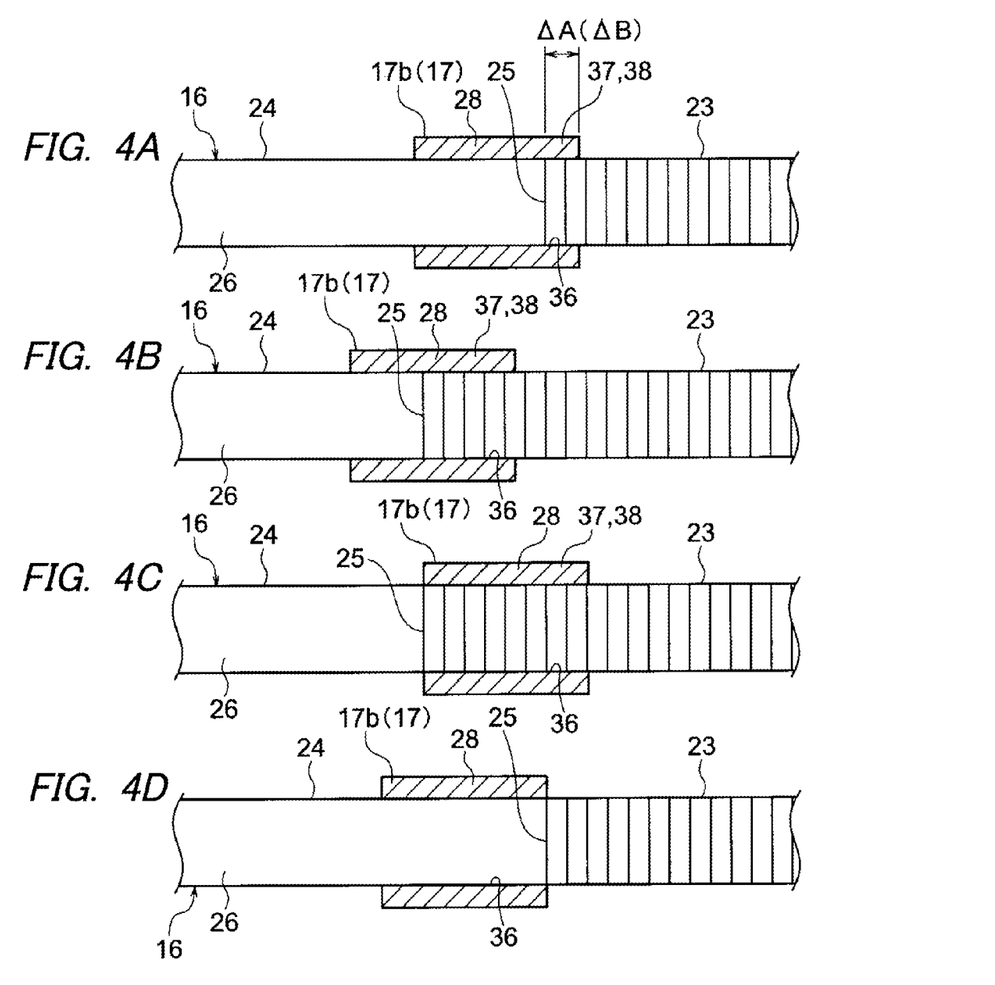
FIGS. 4A to 4D are diagrams illustrating attaching positions of a rigid attaching portion.
Figure 5:
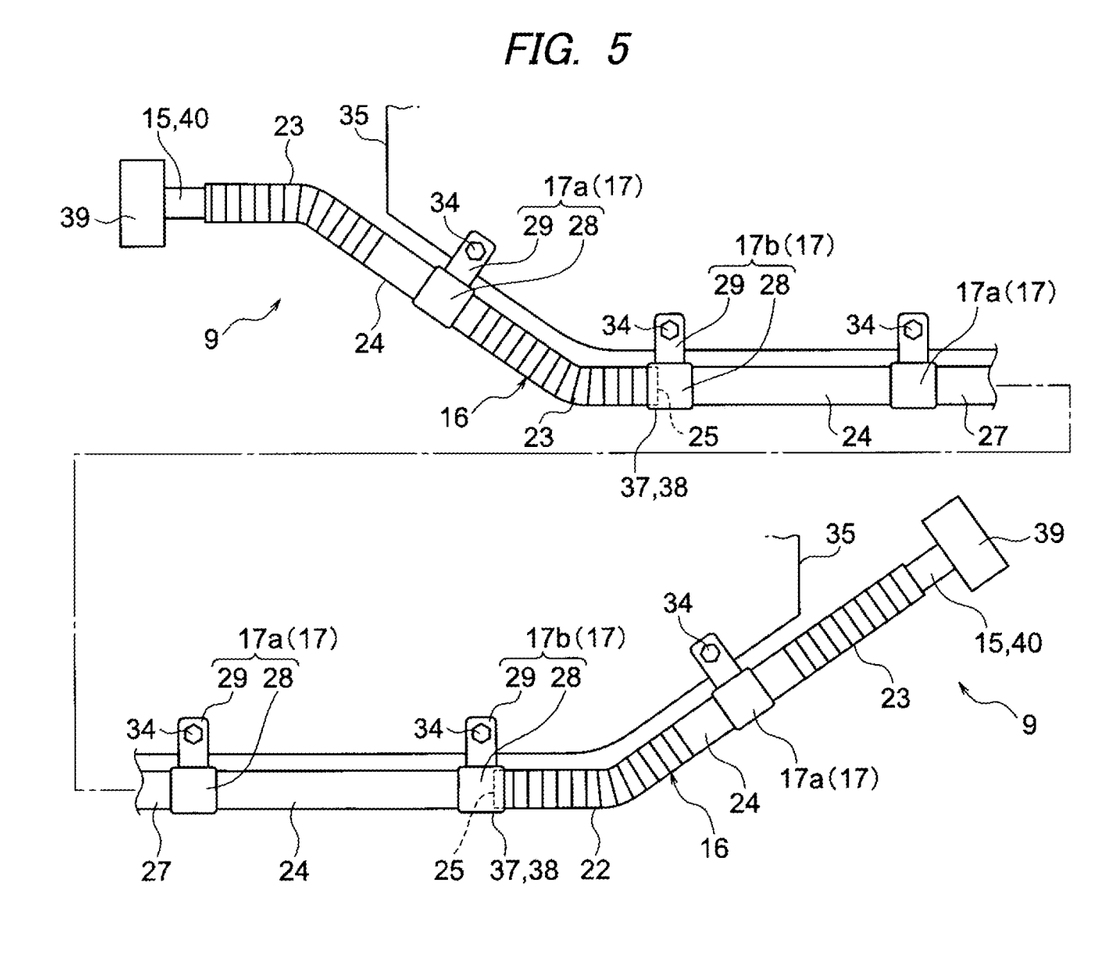
FIG. 5 is a diagram illustrating a fixed state of the wire harness.

In each of FIGS. 4A to 4C, the rigid attaching portion 28 of the clamp 17b is attached such that a portion of or the entire attaching surface 36 thereof overlap the flexible tube portion 23. When the rigid attaching portion 28 is thus attached, the portion of the attaching surface 36 of the rigid attaching portion 28 overlapping the flexible tube portion 23 functions as an inflexible tube extension portion 37 for extending the inflexible tube portion 24. The overlapping portion of the attaching surface 36 of the rigid attaching portion 28 also functions as a tolerance absorbing portion 38 for reducing the influence of the tolerance of the flexible tube portion 23 (in other words, for absorbing the difference of the length ΔA or ΔB).

Incidentally, if there is no need to reduce the influence of the difference of the length ΔA or ΔB (namely, if the flexible tube portion is molded to have a normal (desired) length), the rigid attaching portion 28 is attached to the position of the boundary 25 so as not to overlap the flexible tube portion 23 as illustrated in FIG. 4D.

The post-attached part may be a clip, a grommet, a protector or the like apart from the clamp 17. If such a post-attached part is provided with a function to reduce the influence of an excessive length as described above, it can be used as a replacement of the clamp 17b.

In FIG. 5, the both ends of the wire harness 9 are respectively provided with known shield connectors 39. One of the shield connectors 39 is an inverter-side shield connector, and the other of the shield connectors 39 is a battery-side shield connector. Each shield connector 39 is connected to and fixed to an end 40 of the high-voltage coaxial composite conducting path 15 drawn out of the flexible tube portion 23.

Next, the production, the shipping and the routing of the wire harness 9 will be described. The wire harness 9 is produced by inserting the high-voltage coaxial composite conducting path 15 into the exterior member 16 having been molded into a substantially linear shape as a whole, and thereafter, attaching the shield connectors 39 to the ends 40 and attaching the clamp 17 to a prescribed position in the exterior member 16.

After producing the wire harness 9, when it is bent to be folded in a prescribed position of the flexible tube portion 23, the wire harness 9 can be placed in a state where the inflexible tube portions 24 (namely, the inflexible tube portion 24 and the underfloor inflexible tube portion 27) are substantially parallel to each other. More specifically, it is placed in a state where the inflexible tube portion 24 extends in parallel to the long underfloor inflexible tube portion 27. When placed in such a state, the whole length of the wire harness 9 can be reduced, and the wire harness 9 is packed to have a minimum width. In other words, the wire harness 9 is packed in a compact state. Then, the wire harness 9 is transported in this compact state.

When the wire harness 9 is fixed on the fixing counterpart 35 via the clamp 17 as illustrated in FIG. 5, the routing is completed.

As described with reference to FIGS. 1 to 5 so far, the wire harness 9 includes the exterior member 16 having the flexible tube portion 23 and the inflexible tube portion 24, and the clamp 17b is attached to the boundary 25 between the flexible tube portion 23 and the inflexible tube portion 24, and therefore, a part of the flexible tube portion 23 overlapping the attaching surface 36 of the rigid attaching portion 28 is made to work as a portion difficult to bend. When a part of the flexible tube portion 23 is thus made to work as a portion difficult to bend similarly to the inflexible tube portion 24, the exterior member 16 can reduce the influence of the dimensional variation of the flexible tube portion 23.

The wire harness and the wire harness exterior member of the present embodiment are summarized as follows:

(1) A wire harness exterior member (an exterior member 16) includes a flexible tube portion 23 formed as a flexible portion, an inflexible tube portion 24 formed as an inflexible portion and continuing from the flexible tube portion 23, and a post-attached part (a clamp 17) attached to a boundary between the flexible tube portion 23 and the inflexible tube portion 24. The post-attached part includes a rigid attaching portion 28, the post-attached part being attached such that an attaching surface 36 of the rigid attaching portion 28 partially or entirely overlaps the flexible tube portion 23.

(2) In the wire harness exterior member (the exterior member 16), the portion of the rigid attaching portion 28 overlapping the flexible tube portion 23 is configured as an inflexible tube extension portion 37 for extending the inflexible tube portion 24.

(3) In the wire harness exterior member (the exterior member 16), the portion of the rigid attaching portion 28 overlapping the flexible tube portion 23 is configured as a tolerance absorbing portion 38 for reducing the influence of production tolerance of the flexible tube portion 23.

(4) The wire harness 9 includes any one of the wire harness exterior members (the exterior members 16) of (1) to (3) described above, and a conducting path (a high-voltage coaxial composite conducting path 15) covered by the wire harness exterior member.

Of course, the present invention can be implemented with various changes without changing the gist of the present invention.

What is claimed is:

1. A wire harness comprising:
a wire harness exterior member; and
a conducting path covered by the wire harness exterior member,
wherein the wire harness exterior member comprises:
a flexible tube portion formed as a flexible portion;
an inflexible tube portion formed as an inflexible portion and continuing from the flexible tube portion; and
a post-attached part attached to a boundary between the flexible tube portion and the inflexible tube portion,
wherein the post-attached part comprises a rigid attaching portion, the post-attached part being attached such that at least a portion of an attaching surface of the rigid attaching portion overlaps a selected length of the flexible tube portion,
wherein the selected length is configured to be variable,
wherein the post-attached part includes an attaching portion that affixes the wire harness exterior member to a vehicle,
wherein the flexible tube portion is configured to be inserted into and attached to the rigid attaching portion at varying depths so as to allow for a varying length of the flexible tube portion to extend from the rigid attaching portion, and
wherein the conducing path comprises:
a first conducting path;
a first insulator covering the outer circumference of the first conducting path;
a second conducting path covering the outer circumference of the first insulator;
a second insulator covering the outer circumference of the second conductor; and
an electromagnetic shielding member adhered to the outer circumference of the second insulator.

* * * * *